United States Patent [19]

Suzuki

[11] 4,319,348

[45] Mar. 9, 1982

[54] METHOD AND APPARATUS OF SURVEYING NODULAR TARGETS ON THE SEA FLOOR

[75] Inventor: Tohru Suzuki, Machida, Japan

[73] Assignee: Sumitomo Metal Mining Company Limited, Tokyo, Japan

[21] Appl. No.: 125,590

[22] Filed: Feb. 28, 1980

[30] Foreign Application Priority Data

Feb. 28, 1979 [JP] Japan .................................. 54-22020

[51] Int. Cl.³ .............................................. G01S 15/04
[52] U.S. Cl. .................................. 367/87; 73/432 PS; 73/596; 367/101
[58] Field of Search .......................... 367/87, 100, 101; 73/170 A, 596, 597, 432 PS

[56] References Cited

U.S. PATENT DOCUMENTS

3,174,127 3/1965 Haslett .................................. 367/101
3,555,499 1/1971 Mac Donald et al. ................ 367/87
3,603,919 9/1971 Moore ................................... 367/101

*Primary Examiner*—Richard A. Farley
*Attorney, Agent, or Firm*—Watson, Cole, Grindle & Watson

[57] ABSTRACT

In a method and apparatus for surveying for nodular targets of a grain size of 1 to 15 cm present on the sea floor, pulse waves in each of three frequency ranges of 3 to 4, 10 to 14 and 25 to 50 KHz are radiated onto the sea floor from a ship navigating on the sea. The reflected sound waves of the three frequency pulse waves are received and the reflexibilities of the respective sound waves are measured from the reflected sound pressures and the reflexibilities are composed. The population of the nodular targets is determined from the composed reflexibility and, as required, the grain size of the nodular targets can be determined from at least one of the ratio of the reflexibility of the sound waves of the frequency range of 3 to 4 KHz to the composed reflexibility and the ratio of the reflexibility of the sound waves of the frequency range of 3 to 4 KHz to the reflexibility of the sound waves of range of 25 to 50 KHz.

11 Claims, 8 Drawing Figures

Fig. 1

VARIATION OF THE REFLEXIBILITIES WITH THE GRAIN SIZES OF RESPECTIVE FREQUENCIES (IN KHz)

Fig. 2

VARIATION OF THE REFLEXIBILITIES WITH THE GRAIN SIZES OF RESPECTIVE FREQUENCIES

Fig. 7

METHOD AND APPARATUS OF SURVEYING NODULAR TARGETS ON THE SEA FLOOR

BACKGROUND OF THE INVENTION

1. Field of the Invention

This invention relates to methods and apparatus for surveying for nodular targets present on the sea floor, and more particularly to such method and apparatus adapted to survey for manganese nodules present on the deep sea floor.

2. Description of the Prior Art

In a known method of continuously surveying for nodular targets such as, for example, manganese nodules present on the deep sea floor at a depth of 4,000 to 6,000 meters, the sea floor is continuously photographed with a television camera, or is acoustically investigated by using a sonar suspended near the sea floor. Such a method is described, for example, in JA-OS 69074/53 laid open for public inspection on June 20, 1978. In such a method, a device lowered several thousand meters below the sea level from a ship is towed with a cable while being maintained at a fixed height from the sea floor. However, there are problems in that the surveying speed is restricted to 1 to 2 knots, and that much time is required for survey over a wide range.

There is also known a method of investigating the topography and geological structure of the sea floor wherein sound waves are radiated directly from a ship, and reflected sound waves from the sea floor and the boundary surface of the subsurface layer below the sea floor are observed. The system data are then analyzed to determine the state of the subsurface layer of the sea floor. In the case of granular nodular targets which are distributed and scattered on the sea floor, as no method of analyzing sound waves reflected by such targets has been established, no underwater sonic method of directly surveying for them from a ship has yet been practiced.

SUMMARY OF THE INVENTION

According to the method and apparatus of the present invention, when sound waves are radiated onto the sea floor on which nodular targets are present, the sound pressure of the reflected sound waves will regularly vary with the population, grain size of the nodular targets, and the frequency of the sound waves. Pulse waves within three ranges of frequencies having response peaks where the grain size is comparatively small, medium and large respectively are radiated directly onto the sea floor from a ship. From the reflected sound waves, the population of the nodular targets is known from the composed reflexibility of the reflexibilities of the frequencies within each of the three frequency ranges. Moreover, the grain size of the nodular targets can be determined from at least one of the ratio of the reflexibility of the sound waves of the frequency range of 3 to 4 KHz to the composed reflexibility and the ratio of the reflexibility of the sound waves of the frequency range of 3 to 4 KHz to the reflexibility of the sound waves of range of 25 to 50 KHz.

Therefore, an object of the present invention is to provide both method and apparatus for continuously surveying for nodular targets on the sea floor from a ship navigating at an ordinary investigating speed of about 10 knots.

Another object of the present invention is to provide a simple apparatus for determining the population and grain size of nodular targets present on the sea floor from a ship.

BRIEF DESCRIPTION OF THE DRAWINGS

The foregoing objects, features and advantages of the invention will be more readily apparent from the following description taken in conjunction with the accompanying drawings wherein.

DETAILED DESCRIPTION OF A PREFERRED EMBODIMENT

Where the sea floor is covered by soft mud, or the sea floor is occupied by of flat outcroping rocks and specular reflection can be expected, the sound pressure (amplitude) of the reflected waves will vary with the difference of the wave impedance between the sea water and the subsurface layer. However, in the case where small targets such as manganese nodules are scattered on the sea floor, acoustic waves will be scattered by the small targets. Therefore, the reflected waves received by the receiver on the ship will be so-called back-scattered waves, and the sound pressure will vary not only with the difference of the wave impedance between the sea water and the small targets (when the attenuation caused by absorption and diffusion by the sea water are not considered), but also with respect to such influences caused by scattering as the following:

(1) the frequency f of the transmitting waves,
(2) the population N of the small targets and
(3) the grain size of the small targets.

Now, if R1 is a reflexibility caused by the scattering and R2 is a reflexibility caused by the difference in the wave impedance, the total reflexibility R will be $$R = R1 \cdot R2$$

where R1 can be represented as R1 = F (f, a, n) and R2 can be represented as $$R2 = \frac{\rho_2 V_2 - \rho_1 V_1}{\rho_1 V_1 + \rho_2 V_2}$$

where
- $\rho_1$ is the density of sea water,
- $\rho_2$ is the density of the nodular target,
- $V_1$ is the propagating velocity in m/sec of sound waves in the sea water, and
- $V_2$ is the propagating velocity in m/sec of sound waves in the nodular target.

Figure 1:
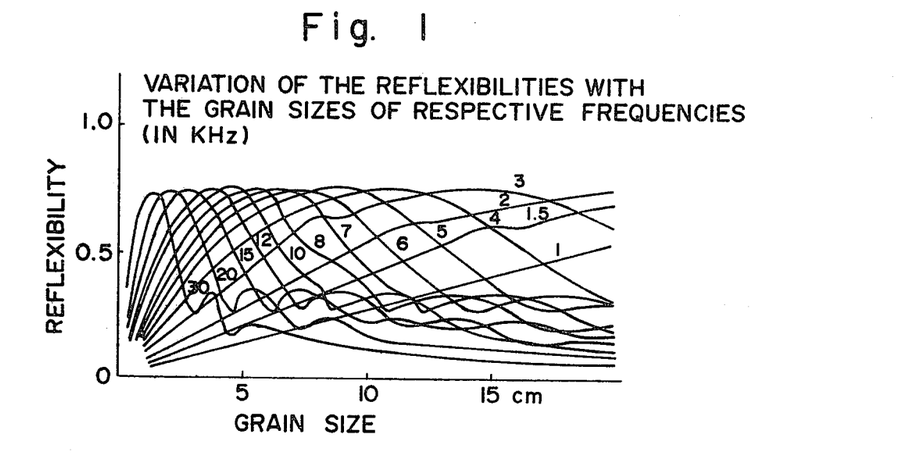
FIG. 1 is a graph showing the variations of the reflexibilities of respective frequency sound waves with the grain sizes of nodular targets on the sea floor.

Here, the reflexibility R2 caused by the wave impedance difference is substantially constant at about 0.8 with specific substances, for example, the sea water and manganese nodules, and only the reflexibility R1 caused by the scattering varies with the above-mentioned (1) frequency, (2) population and (3) grain size. The variation of R1 is linear (proportional) to the distribution rate and varies with respect to the frequency and grain size as shown in FIG. 1. FIG. 1 also illustrates the theoretically calculated variation caused by the grain size of the total reflexibility R=R1 in the case where the maximum population is 78.5%; and R2=1 when small spheres of the same results are arranged in the form of a lattice on a plane.

As the total reflexibility corresponds to the ratio of the sound pressure of reflected waves to the sound pressure of radiated sound waves, the total reflexibility for the sea floor can be derived by measuring the sound pressure of the reflected waves. However, in actual measurement of the sound pressure, it is necessary to consider not only the total reflexibility but also the attenuation caused by diffusion and absorption during travelling of sound wave in the sea water. In particular, the absorption loss depends on the frequency. Therefore, it is necessary to correct the water depth for each frequency of the sound waves. Also, when the sound pressure of the radiated sound waves is varied, correction will also be required. Such correction is made on the basis of the value obtained by previous experimentation. The thus variously corrected sound pressure of the reflected sound waves corresponds to the total reflexibility.

Considering that, when the total reflexibility for some frequencies are composed, and the composed value becomes a value substantially constant irrespective of the grain size, the composed value will be proportional only to the nodular population and the nodular population is easily derived. The present inventor has investigated a combination of such frequencies. As a result, he has discovered that, when the reflexibility of the three frequencies having respective peaks within the total reflexibility where the grain size is respectively small, medium and large are composed (for example, are composed by being simply added, or are combined in the form of composed vector by taking the square root) after squaring and adding the respective values, the composed value substantially constant in the range of 1 to 15 cm of the grain size is obtained.

The grain size to be surveyed is selected between 1 to 15 cm because it is known that the grain size of substantially all of the manganese nodules present on the deep sea floor is not larger than 15 cm, and moreover, according to the present invention, if the grain size which is present is not larger than 1 cm, the precision of detection is somewhat reduced. Furthermore, the judgment as to the presence or absence of nodules having grain size not larger than 1 cm is well within the capabilities of the inventive method and apparatus.

Figure 2:
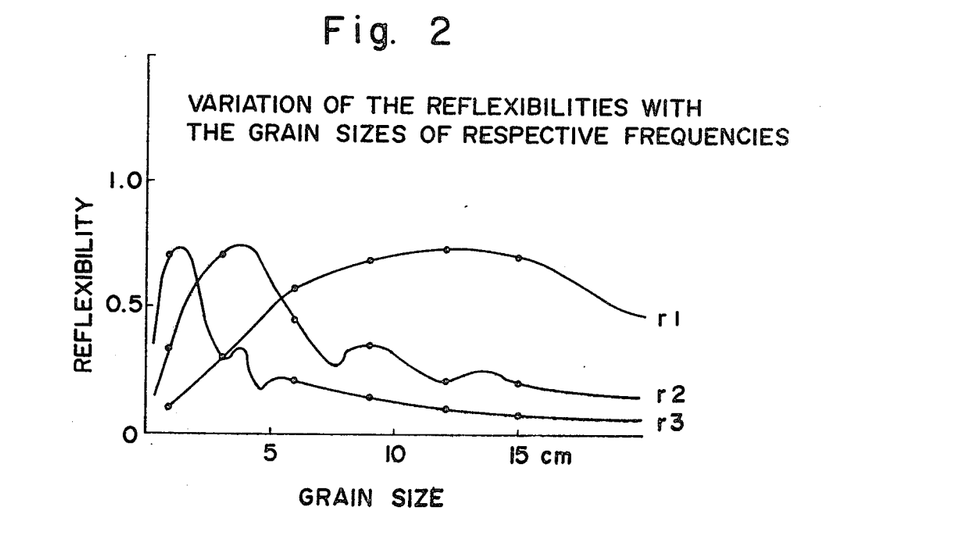
FIG. 2 is a graph showing the variations of the reflexibilities r1, r2 and r3 of sound waves having a frequency of 3.5, 12 and 30 KHz, respectively, with the grain sizes of nodular targets on the sea floor.
Figure 3:
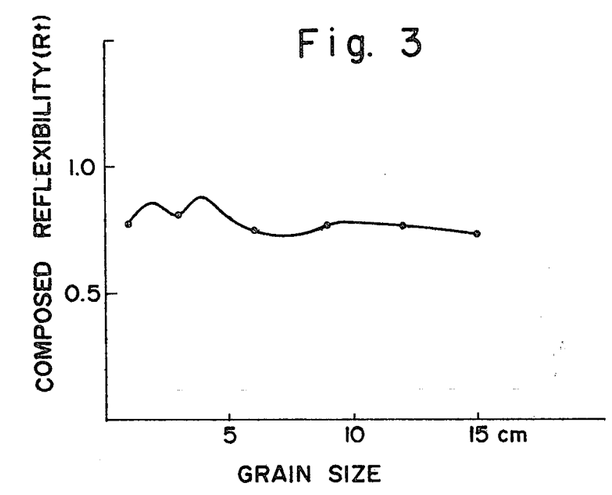
FIG. 3 is a graph showing the variation of the composed reflexibility, Rt, obtained by composing in vector form the reflexibilities r1, r2 and r3.

For example, the results of the composed reflexibility Rt, obtained by composing in vector form the reflexibilities r1, r2 and r3 (see FIG. 2) of the sound waves having respective frequencies of f1=3.5 KHz, f2=12 KHz and f3=30 KHz are shown in Table 1 and FIG. 3.

TABLE 1

| Reflexibility (Frequency in KHz) Grain size a (in cm) | r1 | r2 | r3 | Composed reflexibility | r1/Rt | r1/r3 |
| --- | --- | --- | --- | --- | --- | --- |
| 1 | 0.096 | 0.329 | 0.700 | 0.779 | 0.123 | 0.137 |
| 3 | 0.288 | 0.708 | 0.291 | 0.818 | 0.352 | 0.99 |
| 6 | 0.575 | 0.438 | 0.208 | 0.752 | 0.764 | 2.76 |
| 9 | 0.679 | 0.347 | 0.139 | 0.775 | 0.876 | 4.88 |
| 12 | 0.732 | 0.208 | 0.104 | 0.768 | 0.953 | 7.04 |
| 15 | 0.700 | 0.208 | 0.083 | 0.735 | 0.952 | 8.43 |

As is evident from these results, in the grain size range of 1 to 15 cm, the composed reflexibility Rt is substantially constant within a fluctuation of ±10%, and therefore the nodular population can be derived from this value.

Further, the present inventor considers that, if the ratio of any two reflexibilities varies proportionally to the grain size, the grain size will be able to be derived from such a ratio. That is to say, although the value of the reflexibility itself is proportional to the population of the nodular targets on the sea floor, when the ratio of two reflexibilities is taken, the effect caused by the variation in the nodular population will be cancelled or considerably reduced.

Figure 4:
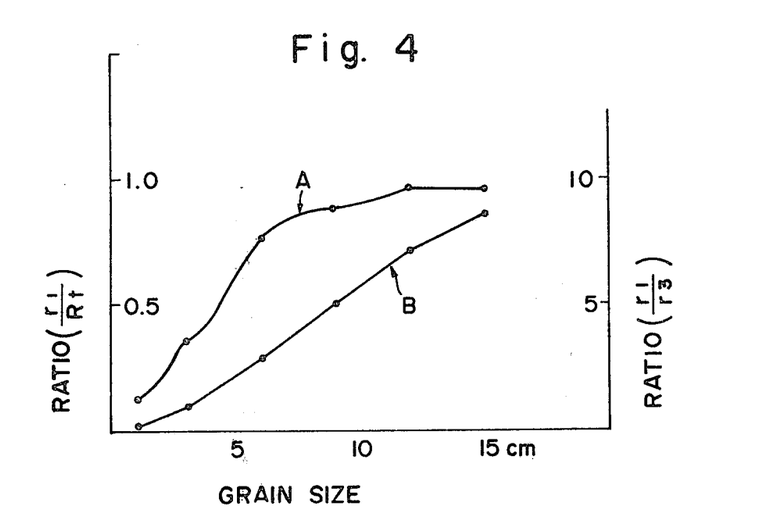
FIG. 4 is a graph showing the variations of the ratio A of the reflexibility r1 to composed reflexibility Rt, and the ratio B of the reflexibility r2 to r3.

Therefore, first of all, when the ratio r1/Rt of the reflexibility r1 (at a frequency f1 of 3.5 KHz) to the composed reflexibility Rt was determined, it varied as shown in Table 1 and by curve A in FIG. 4. Also, when the ratio r1/r3 (the reflexibility r1 of sound waves at a frequency f1=3.5 KHz to the reflexibility r3 of sound waves at a frequency f3=30 KHz) was determined, it varied as shown in Table 1 and by the curve B in FIG. 4. As is evident from a consideration of these curves, either ratio describes a curve having a substantially monotonous increase with increasing grain size. However, if more strictly analyzed, the variation with the grain size of the ratio r1/Rt increases linearly up to a grain size of 1 to 6 cm, but with a grain size of 6 to 12 cm, the gradient with increasing grain size reduces and a discrimination on the grain size remarkably decreases. However, in the grain size range of 1 to 15 cm, the value of the ratio r1/r3 increases substantially linearly and has a high gradient, but in the grain size range of 1 to 6 cm, the ratio R1/Rt has a somewhat higher gradient.

Thus, by using either of the two ratios, or both of them within different portions of the range, the grain size (1 to 15 cm) of manganese nodules to be actually surveyed can be determined substantially irrespective of their population on the sea floor.

The combination of the proper frequencies of pulse waves to be used may be any combination in which the composed reflexibility has a fluctuation within ±10%, or preferably within ±5%, in the grain size range of 1 to 15 cm.

Figure 5:
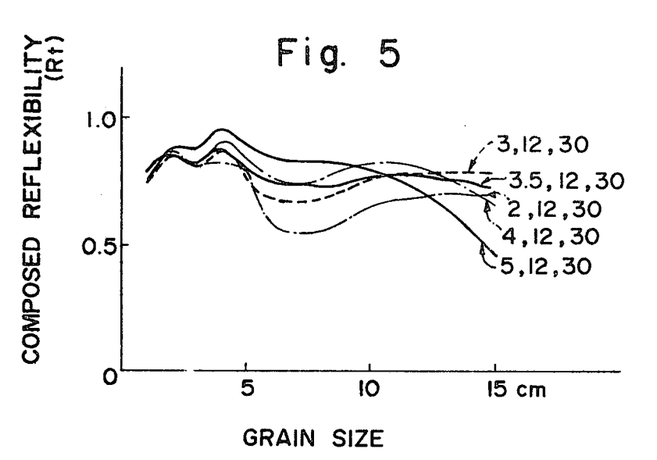
FIG. 5 is a graph showing the variation of the composed reflexibility Rt when minimum frequency f1 is varied.

The composed reflexibilities in the cases where the pulse wave frequencies f2=12 KHz and f3=30 KHz are fixed and the minimum frequency f1 is varied in the range of 2 to 5 KHz are shown in FIG. 5. It is evident that the range of the preferable minimum frequency f1 is 3 KHz$\leq$f1$\leq$4 KHz, as such a range provides a lesser variation of the composed reflexibility Rt.

Figure 6:
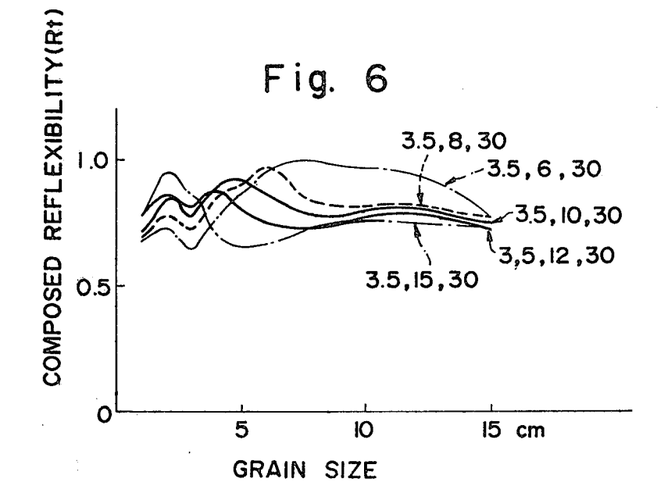
FIG. 6 is a graph showing the variation of the composed reflexibility Rt when intermediate frequency f2 is varied.

Also, the composed reflexibilities in the cases where the pulse wave frequencies f1=3.5 KHz and f3=30 KHz are fixed and the intermediate frequency f2 is varied in the range of 6 to 15 KHz are shown in FIG. 6. It is evident that the preferred range of the intermediate frequency f2 is 10 KHz$\leq$f2$\leq$14 KHz, as that range produces a lesser variation of the composed reflexibility Rt.

Figure 7:
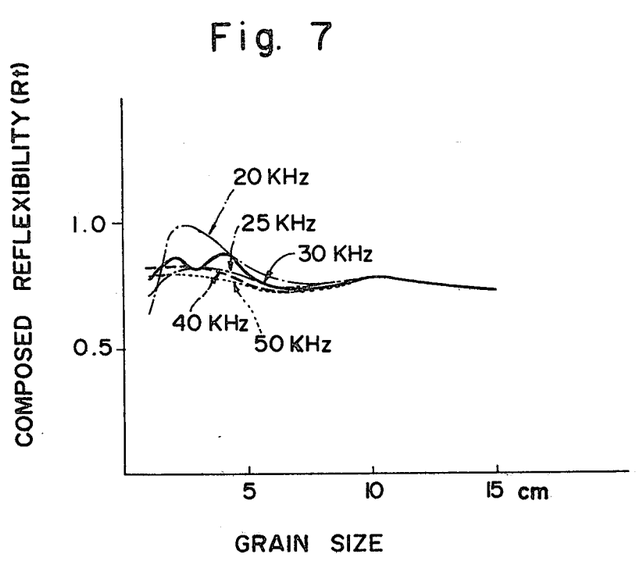
FIG. 7 is a graph showing the variation of the composed reflexibility Rt when maximum frequency f3 is varied.

Finally, the composed reflexibilities in the cases where the pulse wave frequencies f1=3.5 KHz and f2=12 KHz are fixed and the maximum frequency f3 is varied in the range of 20 to 50 KHz are shown in FIG. 7. It is apparent that the preferred range of the maximum frequency f3 to provide a lesser variation in the composed reflexibility Rt is 25 KHz$\leq$f3$\leq$50 KHz.

In the case where no nodular target is present, no back-scattering will be produced, therefore the reflexibility caused by scattering will be r1=1, and the total reflexibility R will be independent of the frequency. However, when the sea floor is covered by soft mud, for example, the reflexibility caused by difference in wave impedance will be r2=0.1 to 0.2 and the total reflexibility R will become so much smaller than when nodular targets are present such that the judgment on the presence of nodular targets is possible. But in the case where the sea floor is occupied of outcroping rocks, for example, reflexibility r2=0.8 to 0.9 and the total reflexibility R will not be so different from that in the case where nodular targets are present, or the total flexibility R will become larger but, in the case of outcroping rocks, so many reflecting surfaces will be formed on the sea floor, or within the outcroping rocks, that the reflected sound waves will have reverberations and they will be easily determined by the wave forms of the received reflected waves.

Figure 8:
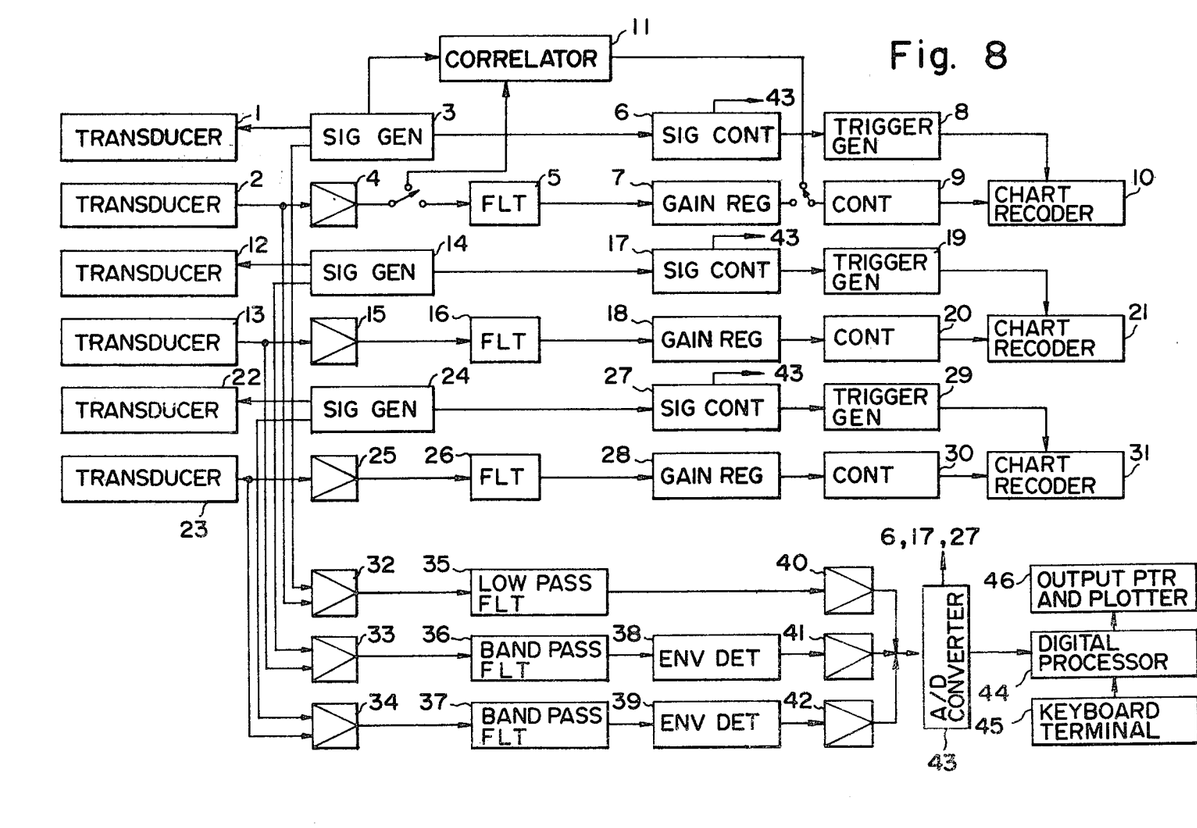
FIG. 8 is a block diagram of an apparatus according to the present invention.

A block diagram of an apparatus embodying the method of the present invention is shown in FIG. 8. Transducers 1, 12 and 22 respectively convert electric oscillations of the three frequencies f1, f2 and f3 into sound waves and radiate them toward the sea floor.

Transducers 2, 13 and 23 respectively receive reflected sound waves of the three frequencies f1, f2 and f3 from the sea floor and convert them into electric oscillation signals. The transducers 1 and 2, 12 and 13 and 22 and 23 may be respectively the same units. Signal generators 3, 14 and 24 are respectively connected to transducers 1, 12 and 22. Signal controllers 6, 17 and 27 respectively control the pulse lengths and powers of the respective output signals from signal generators 3, 14 and 24. Trigger generators 8, 19 and 29 are respectively responsive to the output of signal controllers 6, 17 and 27. Controllers 9, 20 and 30 permit chart recorders 10, 21 and 31 to sweep the reflected sound wave outputs from gain regulators 7, 18 and 28 at proper time intervals and in proper water depth ranges, and control the contrast and intensity of the corresponding sound wave to be recorded on the chart sheets. Chart recorders 10, 21 and 31 respectively sweep the sound wave information from controllers 9, 20 and 30 onto chart sheets. The chart recorders 21 and 31 further describe the traces of the reflected sound waves from the sea floor on the chart sheets so as to indicate the relationship between the time or distance and the water depth range. The chart recorder 10 is provided with not only the same function as that of chart recorders 21 and 31 but also functions to indicate the status, for example, geological structure, under the ground surface.

Correlator 11 enables the detection of the received sound wave signal by using the transmitting signal as a reference. In the ordinal process of the receiving sound wave of the frequency f1 component an output of the pre-amplifier 4 is connected to the filter 5 by switching. In this case an output of the gain regulator 7 is connected to the controller 9. On the other hand, when a correlation is made between the receiving sound wave and the transmitting sound wave of the frequency f1 component, an output of the pre-amplifier 4 is connected to the correlator 11 by means of switch SW1.

In this case an output of the correlator 11 is connected to the controller 9 so that a received signal can be detected by making a correlation between the received and transmitted sound waves in correlator 11.

Pre-amplifiers 4, 15 and 25 respectively regulate the electric signal outputs from transducers 2, 13 and 23 between 1 mV to 1 V. Filters 5, 16 and 26 filter the respective output signals from pre-amplifiers 4, 15 and 25.

Gain regulators 7, 18 and 28 regulate the signal level of the respective outputs from filters 5, 16 and 26.

Isolation pre-amplifiers 32, 33 and 34 having dual channels respectively regulate the output signal levels from the respective signal generators 3, 14 and 24 and the associated pre-amplifiers 4, 15 and 25 as shown in FIG. 8 within 1 mV to 1 V, and the respective outputs of pre-amplifiers 32, 33 and 34 are input to dual channel low pass filter 35 and dual channel bandpass filters 36 and 37. Low pass filter 35 is in the channel for the f1 component of the sound waves. Bandpass filters 36 and 37 are respectively in the channels for the f2 and f3 components of the sound waves. Envelope detectors 38 and 39 having dual channels respectively detect the envelopes of the f2 and f3 signal components in the outputs from bandpass filters 36 and 37. Logarithmic amplifiers 40, 41 and 42 having dual channels are respectively responsive to the f1, f2 and f3 signal components in the outputs from low pass filter 35 and bandpass filters 36 and 37.

A/D converter 43 converts the analog signal outputs from logarithmic amplifiers 40, 41 and 42 into digital signals. A/D converter 43 also converts analog signals from signal controllers 6, 17 and 27 into digital signals. The channels converted into the digital signals by the converter 43 are selected in accordance with a program incorporated in a digital processor 44. That is, the data taken in through the A/D converter 43 are controlled in accordance with the program of the digital processor 44. Digital processor 44 comprising a central processor unit, i.e. a mini-computor in the practical operation corrects the depth in accordance with a travel time of the return signals received by transducers 2, 13 and 23; calibrates and corrects the effect caused by the variation of the transmitted signals by using the transmitted signal level or correlating the received signal with the transmitted signals, as required, of the f1 signal wave component; and makes such calculations and statistical analysis as to the predictive nodule population and predictive nodule size.

A trigger signal indicating a radiated time of the transmitting sound waves from the signal controllers 6, 17 and 27 is transmitted to the A/D converter 43 according to this information the digital processor 44 treats immediately the transmitted signal.

Keyboard terminal 45 provides a means for the input of various parameters required to carry out the above-mentioned operations, or the manual input of such required parameters as the date, time and profile name to be entered into digital processor 44.

Printer and plotter 46 enables graphs and tables to be made from the predictive nodule population and predictive nodule size information to be obtained, as well as other information desired in accordance with the invention.

In practical operation of the invention, pulse waves of three different frequencies, namely, f1, f2 and f3 (for example, having a pulse width of 10 millisecond and a power of 10 KW) are radiated at intervals of about 10 seconds from transducers 1, 12 and 22 mounted on board a survey ship navigating at a speed of 9 to 10 knots. The reflected waves from the sea floor returning after several seconds, for example 6 seconds, are redeived by transducers 2, 13 and 33, and are processed by the circuitry previously described and are recorded on the chart recorders 10, 21 and 31.

The input information for the data processing system comprising the components 32 to 45 is the transmitting trigger and electric oscillation signals converted to correspond respectively to the transmitted sound pressure level and received sound pressure level. When the trigger signal is received by A/D converter 43, the data processing systems treats the transmitting signal and stores the resulting information within a memory circuit in digital processor 44. Then the operation, statistical processing and program for display of the previously stored data are carried out in digital processor 44 until a semi-automatically set arrival time of the reflected wave (about 5 seconds).

The received signal is continuously processed as follows for about 4 seconds in the data processing system. The f1 signal component is digital-converted by A/D converter 43 after passing through pre-amplifier 32, low pass filter 35 and logarithmic amplifier 40. The f2 and f3 signal components are digital-converted by A/D converter 43 after respectively passing through pre-amplifier 33 and 34, bandpass filters 36 and 37, detectors 38 and 39 and logarithmic amplifiers 41 and 42. The pulse wave envelopes of the f2 and f3 components are detected by envelope detectors 38.

In the digital processor 44, the arrival time of the received signal is known from the operation of a built-in timer, the depth indication is corrected by that time and the variation of the transmitted sound pressure is calibrated and corrected by using transmitted signal level information stored therein. The f1 signal component is processed correlatively between the transmitted and received wave signals as required.

After these processes are carried out, various operations are made again in digital processor 44 and the predictive nodule population and predictive nodule size are calculated, are temporarily stored to be statistically processed, and are indicated on the printer and plotter of output device 46 as average values or running averages of the data for the last 15 to 30 times (equivalent to time intervals of 150 to 300 seconds).

Further, for the actual observation of the wave forms of received sounds, it is preferable to obtain two sets of data as follows:

(a) a maximum amplitude (time duration of about 1 millisecond) and (b) an integrated value of a fixed time duration (about 10 milliseconds).

and to obtain local information from the former and averaging information from the latter.

The profile means, latitude, longitude, date and time can also be displayed by manual inputs using keyboard terminal 45, as required, on the printer and plotter of output device 46.

These statistical processing and indicating programs are designated and carried out according to the feature of the area to be surveyed and the purpose of the survey.

A survey was made in an area of the deep sea in which manganese nodules were present on the sea floor with the method and apparatus of the present invention. The results indicate a very good correspondence to the data of the population and grain size obtained with a television camera or confirmed by direct sampling of the nodules.

As explained above, the surveying method and apparatus of the present invention afford excellent results that nodular targets on the sea floor can be effectively surveyed directly from a ship navigating at an ordinary speed on the sea, and that a survey over a wide range is easily possible. Further, according to the present invention, it is possible to predict effectively not only the population but also the grain size of nodules.

What is claimed is:

1. A method of surveying nodular targets on the sea floor wherein the nodular targets have a grain size of 1 to 15 cm, comprising the steps of:
   radiating sound waves onto the sea bottom from a ship navigating on the sea, said sound waves comprising pulse waves of three different frequencies f1, f2 and f3, wherein $3\text{ KHz} \leq f1 \leq 4\text{ KHz}$, $10\text{ KHz} \leq f2 \leq 14\text{ KHz}$ and $25\text{ KHz} \leq f3 \leq 50\text{ KHz}$;
   receiving the reflected pulse sound waves of said three frequencies;
   determining the respective reflexibilities from the sound pressures of said reflected sound waves;
   composing said reflexibilities; and
   deriving the population of said nodular targets from said composed reflexibility.

2. The method according to claim 1 further comprising the step of demodulating the grain size of said nodular targets from at least one of the ratio of the reflexibility of the sound waves of said frequency f1 to said composed reflexibility and the ratio of the reflexibility of the sound waves of said frequency f1 to the reflexibility of the sound waves of said frequency f3.

3. The method according to claim 2 further comprising the step of limiting fluctuation of the composed reflexibility to within ±10%.

4. The method according to claim 3 comprising the step of limiting fluctuation of the composed reflexibility to within ±5%.

5. The method according to any of claims 1, 2, 3 or 4 wherein said step of composing the reflexibilities comprises adding the reflexibilities of said f1, f2 and f3 frequencies together.

6. The method according to any of claims 1, 2, 3 or 4 wherein the composite of said reflexibilities is determined by taking the square root after squaring and adding the reflexibilities of said three frequencies f1, f2 and f3.

7. A method of surveying nodular targets on the sea floor wherein the nodular targets have a grain size of 1 to 15 cm, comprising the steps of:

radiating sound waves onto the sea floor from a ship navigating on the sea, said sound waves comprising pulse waves of three different frequencies f1, f2 and f3, wherein 3 KHz≦f1≦4 KHz, 10 KHz≦f2≦14 KHz and 25 KHz≦f3≦50 KHz;

receiving the reflected pulse sound waves of said three frequencies;

determining the respective reflexibilities from the sound pressures of said reflected sound waves;

composing said reflexibilities; and determining the grain size of said nodular targets from at least one of the ratio of the reflexibility of the sound waves of said frequency f1 to said composed reflexibility and the ratio of the reflexibility of the sound waves of said frequency f1 to the reflexibility of the sound waves of said frequency f3.

8. An apparatus for surveying nodular targets of a grain size of 1 to 15 cm present on the sea floor, comprising:

means for radiating pulse waves of three frequencies within the respective ranges of 3 to 4, 10 to 14 and 25 to 50 KHz, toward the sea floor;

means for receiving the reflected sound waves of the pulse waves of said three frequencies;

means for measuring the respective reflexibilities of said three frequencies from said reflected sound waves;

means for composing said respective reflexibilities; and means for deriving the population of the nodular targets from said composed reflexibility.

9. The apparatus according to claim 8 further comprising a means for determining the grain size of said nodular targets from the ratio of the reflexibility of the sound waves of said frequency within the range of 3 to 4 KHz to said composed reflexibility.

10. The apparatus according to claim 8 or 9 further comprising means for determining the grain size of said nodular targets from the ratio of the reflexibility of the sound waves of said frequency within the range of 3 to 4 KHz to the reflexibility of the sound waves of said frequency with the range of 25 to 50 KHz.

11. An apparatus for surveying nodular targets of a grain size of 1 to 15 cm present on the sea floor, comprising:

means for radiating pulse waves of three frequencies within the ranges of 3 to 4, 10 to 14 and 25 to 50 KHz, toward the sea floor from a ship navigating on the sea;

means for receiving the reflected sound waves of the pulse waves of said three frequencies;

means for measuring the respective reflexibilities of said three frequencies from said reflected sound waves;

means for composing said respective reflexibilities; and means for determining the grain size of the nodular targets from at least one of the ratio of the reflexibility of the sound waves of said frequency within the range of 3 to 4 KHz to said composed reflexibility and the ratio of the reflexibility of the sound waves of said frequency within the range of 3 to 4 KHz to the reflexibility of the sound waves of said frequency within the range of 25 to 50 KHz.

* * * * *